(12) United States Patent
Inoue et al.

(10) Patent No.: US 11,628,790 B2
(45) Date of Patent: Apr. 18, 2023

(54) COLUMN COVER UNIT

(71) Applicants: TOYOTA JIDOSHA KABUSHIKI KAISHA, Aichi (JP); SUBARU CORPORATION, Tokyo (JP)

(72) Inventors: Shotaro Inoue, Nisshin (JP); Yutaka Kondoh, Nagoya (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/202,344

(22) Filed: Mar. 16, 2021

(65) Prior Publication Data

US 2021/0316686 A1  Oct. 14, 2021

(30) Foreign Application Priority Data

Apr. 9, 2020 (JP) .............................. JP2020-070426

(51) Int. Cl.
*B60R 21/05* (2006.01)
(52) U.S. Cl.
CPC ..................................... *B60R 21/05* (2013.01)
(58) Field of Classification Search
CPC ............ B60R 21/05; B62D 1/18; B62D 1/195
See application file for complete search history.

(56) References Cited

U.S. PATENT DOCUMENTS

| | | | | |
|---|---|---|---|---|
| 5,280,956 A * | 1/1994 | Tanaka | .................. | B60R 21/045 |
| | | | | 280/752 |
| 10,875,565 B2 * | 12/2020 | Krstic | ...................... | B62D 1/16 |
| 2009/0085338 A1 * | 4/2009 | Tanaka | ..................... | B60R 21/05 |
| | | | | 280/752 |
| 2009/0158880 A1 * | 6/2009 | Myers | ...................... | B62D 1/16 |
| | | | | 74/492 |
| 2010/0043588 A1 * | 2/2010 | Fukawatase | ............. | B62D 1/19 |
| | | | | 74/492 |
| 2018/0346013 A1 * | 12/2018 | Abramoski | .............. | B62D 1/19 |

FOREIGN PATENT DOCUMENTS

| | | | |
|---|---|---|---|
| JP | H35677 U | | 1/1991 |
| JP | 2531093 Y2 | * | 4/1997 |
| JP | 2001063590 A | * | 3/2001 |
| JP | 2008068807 A | * | 3/2008 |
| JP | 2009166785 A | | 7/2009 |
| JP | 2010173439 A | | 8/2010 |
| JP | 2014129011 A | | 7/2014 |
| KR | 20020049079 A | * | 6/2002 |
| WO | WO-2022083962 A1 | * | 4/2022 |

* cited by examiner

*Primary Examiner* — Karen Beck
*Assistant Examiner* — Scott F. Underwood
(74) *Attorney, Agent, or Firm* — Hauptman Ham, LLP

(57) ABSTRACT

A column cover unit may include: a column cover configured to cover a steering column of a vehicle and comprising a first cover portion and a second cover portion, wherein a boundary between the first cover portion and the second cover portion extends from a front end of the column cover at a front portion of the vehicle toward a rear portion of the vehicle; and a contact member configured to separate the first cover portion and the second cover portion from each other at the boundary by contacting the column cover when the column cover is moved toward the front portion of the vehicle with the steering column.

3 Claims, 3 Drawing Sheets

COLUMN COVER UNIT

CROSS-REFERENCE TO RELATED APPLICATION

This application claims priority to Japanese Patent Application No. 2020-070426 filed on Apr. 9, 2020, the contents of which are hereby incorporated by reference into the present application.

TECHNICAL FIELD

The technique disclosed herein relates to a column cover unit.

Japanese Patent Application Publication No. 2009-166785 describes a structure of a column cover. The column cover includes a first cover body and a second cover body disposed at a rear end of the first cover body. The second cover body is configured to move relative to the first cover body.

With this configuration, if a load greater than a predetermined value is applied to a steering column due to, for example, a frontal collision of a vehicle and the steering column contracts, the second cover body moves frontward relative to the first cover body in an axial direction of the steering column, and the column cover thereby contracts.

SUMMARY

A column cover covers a steering column protruding toward a cabin. When the steering column contracts, the column cover moves toward a front portion of the vehicle with contraction of the steering column. At this occasion, the contraction of the steering column should not be obstructed by a member disposed frontward of the column cover in the vehicle. The present disclosure provides art to prevent a column cover from obstructing contraction of a steering column.

The disclosure herein discloses a column cover unit. The column cover unit may comprise a column cover configured to cover a steering column of a vehicle and comprising a first cover portion and a second cover portion, wherein a boundary between the first cover portion and the second cover portion extends from a front end of the column cover at a front portion of the vehicle toward a rear portion of the vehicle; and a contact member configured to separate the first cover portion and the second cover portion from each other at the boundary by contacting the column cover when the column cover is moved toward the front portion of the vehicle with the steering column.

With this configuration, the column cover is separated into the first cover portion and the second cover portion as the column cover is moved toward the front portion of the vehicle with the steering column. With this configuration, the first cover portion and the second cover portion may be released so that the first cover portion and the second cover portion are not caught by a member disposed frontward of the column cover in the vehicle. Due to this, a situation where the column cover may not move toward the front portion of the vehicle due to being caught by the member disposed frontward thereof and the contraction of the steering column is thereby hindered may be avoided.

EMBODIMENTS

Some of the technical elements of the column cover unit disclosed herein will be listed below. It should be noted that the respective technical elements are independent of one another, and are useful solely or in combinations.

In an aspect of the column cover unit disclosed herein, the contact member may be included in an instrument panel positioned frontward of a driver seat of the vehicle. With this configuration, the instrument panel disposed frontward of the column cover is used as the contact member, and a need of additional contact member(s) is thereby eliminated.

In an aspect of the column cover unit disclosed herein, the boundary may be positioned between the first cover portion and the second cover portion in an up-down direction, and the contact member may be configured to separate the first cover portion and the second cover portion from each other in the up-down direction at the boundary. With this configuration, the first cover portion and the second cover portion of the column cover may be separated and released. Due to this, a member extending in a vehicle width direction may be disposed frontward of the column cover in the vehicle.

In an aspect of the column cover unit disclosed herein, the contact member may comprise a surface facing the front end of the column cover at the front end of the column cover in the front portion of the vehicle, and the surface may be inclined toward the front portion of the vehicle in a direction along which the first cover portion and the second cover portion are separated from each other. With this configuration, in the column cover, the first cover portion and the second cover portion may be gradually separated from each other along an inclination of the surface. This enables smooth separation between the first cover portion and the second cover portion.

Figure 1:
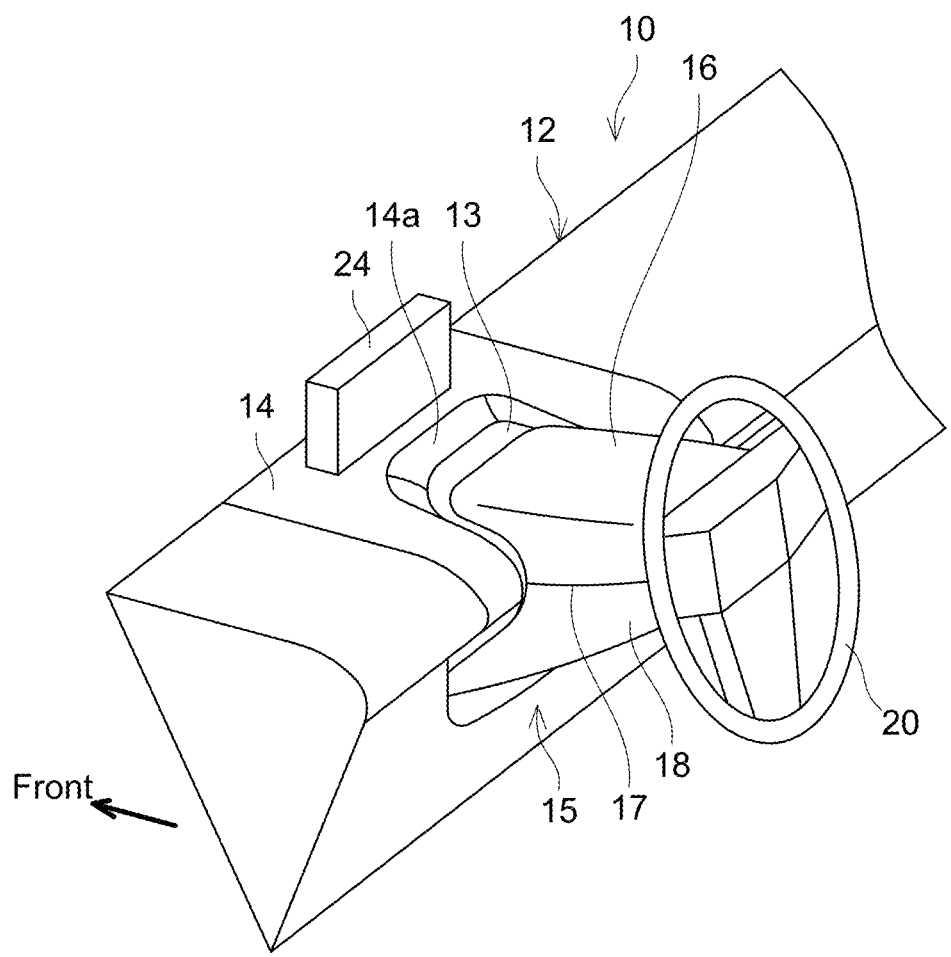
FIG. 1 schematically shows a perspective view of a vicinity of a steering column of an embodiment.

An embodiment will be described with reference to drawings. It should be noted that, in the drawings to be referred to in the present embodiment, a part of the configuration is omitted so that a characteristic part of the embodiment can be clearly seen. In an actual configuration, configuration(s) other than the configuration to be explained in the disclosure and the drawings below may be included. A column cover unit 10 of the embodiment shown in FIG. 1 is mounted in a vehicle. The column cover unit 10 is disposed frontward of a steering wheel 20 in the vehicle. The column cover unit 10 includes a column cover 15 and a contact portion 13. Hereafter, "front", "rear", "upper", and "lower" relative to the vehicle are simply referred to as "front", "rear", "upper", and "lower", respectively. Further, "vehicle width direction" hereinafter refers to a direction perpendicular to a front-rear direction and to an up-down direction.

(Configuration of Instrument Panel)

An instrument panel 12 is disposed over an entirety of a front end of a passenger compartment in the vehicle width direction below a windshield (not shown). A space where occupant(s) of the vehicle can place their feet is provided below the instrument panel 12. The instrument panel 12 may be referred to as a dashboard. The instrument panel 12 supports a display 24 including instrument clusters displaying a vehicle speed and the like. The instrument panel 12 includes a contact portion 13 disposed frontward of the column cover 15 in the vehicle, and the contact portion 13 has a shape conforming with the column cover 15. The instrument panel 12 further includes an upper end panel 14 disposed above and covering the contact portion 13.

Figure 2:
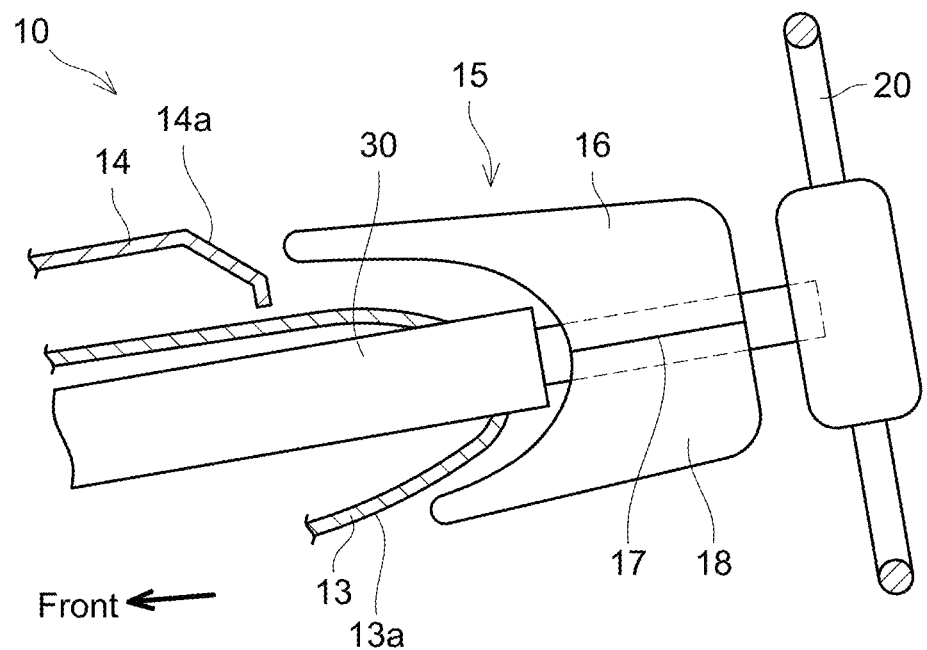
FIG. 2 shows a cross sectional view of a column cover and an instrument panel.

The upper end panel 14 is a plate-like member extending under the display 24 from a front end of the instrument panel 12 toward a rear portion of the vehicle. A rear end of the upper end panel 14 has a shape conforming with a front end of the column cover 15. The upper end panel 14 includes a contact surface 14a spaced apart from and facing the front end of the column cover 15. As shown in FIG. 2, the contact surface 14a includes a flat inclined surface inclined upward from its rear end to its front end.

The contact portion 13 is disposed below the upper end panel 14. The contact portion 13 includes a curved surface curving to conform with the front end of the column cover 15. The curved surface includes a contact surface 13a facing a lower end of the column cover 15. The contact surface 13a curves downward toward its front portion. The contact surface 13a includes an inclined surface inclined downward toward its front portion. A steering column 30 penetrates the contact portion 13 at the center thereof in the vehicle width direction.

(Configuration of Column Cover)

The column cover 15 is disposed between the steering wheel 20 and the instrument panel 12. The column cover 15 covers the steering column 30 which protrudes rearward from the instrument panel 12, that is, protrudes toward the passenger compartment. With this configuration, the steering column 30 is hardly visible from the occupant(s). The column cover 15 includes a first cover portion 16 and a second cover portion 18. The second cover portion 18 is disposed at a lower portion of the column cover 15. The second cover portion 18 is disposed below the steering column 30 protruding from the instrument panel 12. The second cover portion 18 includes a lower wall positioned below the steering column 30, sidewalls extending upward from both ends of the lower wall in the vehicle width direction on lateral sides of the steering column 30, and a rear wall connected to rear ends of the sidewalls and a rear end of the lower wall. A front end of the second cover portion 18 is disposed to be spaced apart from the contact portion 13. A clearance between the front end of the second cover portion 18 and the contact portion 13 is shortest at a portion where the second cover portion 18 faces the contact surface 13a.

The first cover portion 16 is disposed above the second cover portion 18. The first cover portion 16 is disposed above the steering column 30 protruding from the instrument panel 12. The first cover portion 16 includes an upper wall positioned above the steering column 30, sidewalls extending downward from both ends of the upper wall in the vehicle width direction on lateral sides of the steering column 30, and a rear wall connected to rear ends of the sidewalls and a rear end of the upper wall. The sidewalls of the first cover portion 16 and the sidewalls of the second cover portion 18 are joined at a boundary 17. The boundary 17 extends in the front-rear direction from a front end to a rear end of the column cover 15. The boundary 17 extends along an axial direction of the steering column 30. A front end of the first cover portion 16 faces the contact surface 14a of the upper end panel 14 at an upper end of the first cover portion 16. A clearance between the first cover portion 16 and the contact surface 14a is shorter than the clearance between the second cover portion 18 and the contact portion 13.

The column cover 15 is attached to the steering column 30. Specifically, the second cover portion 18 is fixed to the steering column 30. The first cover portion 16 is attached to the steering column 30 by being fixed to the second cover portion 18. The steering column 30 penetrates and extends through the rear wall of the first cover portion 16 and the rear wall of the second cover portion 18, and is connected to the steering wheel 20.

(Configuration of Steering Column)

The steering column 30 includes a cylinder that is extendable and contractable in the front-rear direction. The steering column 30 can change its state among three states, namely, a normal state as shown in FIG. 2 (that is, a state in which the steering wheel 20 is disposed at a position for a driver to hold the steering wheel 20 to drive), a first contracted state where the steering column 30 contracts from the normal state, and a second contracted state where the steering column 30 contracts more as compared to the first contracted state. In the first contracted state, the steering column 30 moves the steering wheel 20 frontward by, for example, contracting so that the steering wheel 20 does not obstruct a driver getting on and off the vehicle. In this case, the steering column 30 contracts to an extent where the column cover 15 does not come into contact with the upper end panel 14 and the contact portion 13. In other words, the clearance between the column cover 15 and the upper end panel 14 and the clearance between the column cover 15 and the contact portion 13 are each greater than a contracted amount of the steering column 30 in the first contracted state. The contracted amount in the first contracted state may vary in accordance with situations where the steering column 30 is to contract. Further, in the normal state, a position of the steering wheel 20 in the front-rear direction may be adjustable based on a size of a driver by extension and contraction of the steering column 30.

Figure 3:
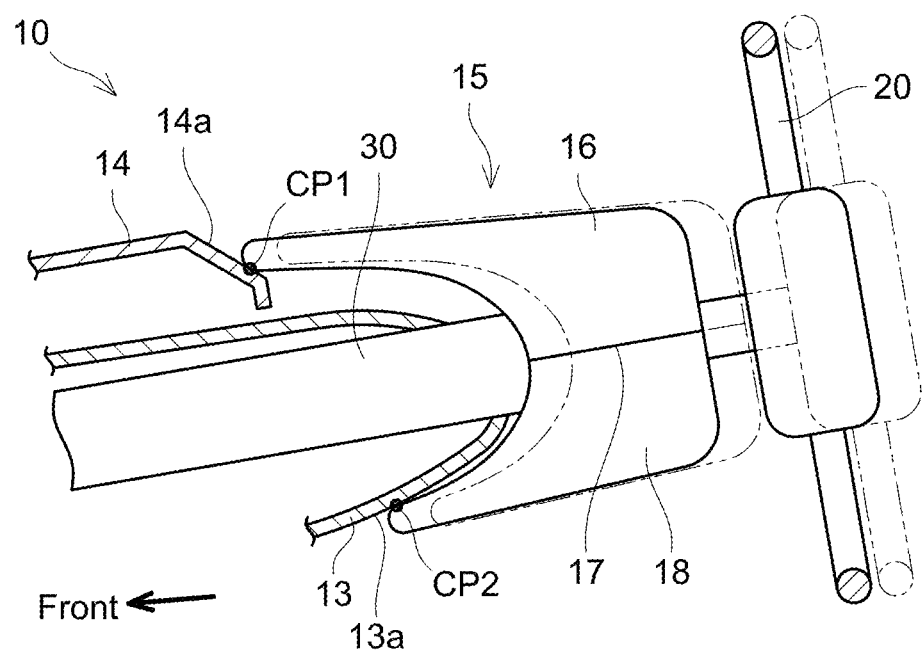
FIG. 3 shows a cross-sectional view to explain a motion of the column cover when the steering column contracts.

In the second contracted state, the steering column 30 contracts when a load applied to the steering wheel 20 upon a collision of the vehicle is greater than a predetermined value (for example, when the driver collides with an airbag inflating from the steering wheel 20 due to the collision of the vehicle). Due to this, collision impact can be absorbed. FIG. 3 shows a state of the steering column 30 being in transition from the normal state to the second contracted state. In FIG. 3, the steering column 30, the steering wheel 20, and the column cover 15 in the normal state are depicted in two-dot-chain lines. As shown in FIG. 3, in the transition state from the normal state to the second contracted state, the first cover portion 16 of the column cover 15 comes into contact with the contact surface 14a of the upper end panel 14 at a contact position CP1. Further, the second cover portion 18 of the column cover 15 comes into contact with the contact surface 13a of the contact portion 13 at a contact position CP2. The steering column 30 further contracts from the state shown in FIG. 3. The steering wheel 20 and the column cover 15 are moved further frontward with the contraction of the steering column 30. As a result, the front end of the first cover portion 16 slides on the contact surface 14a and thereby is pushed upward along an inclination of the contact surface 14a. Similarly, the front end of the second cover portion 18 slides on the contact surface 13a and thereby is pushed downward along a curvature of the contact surface 13a.

Figure 4:
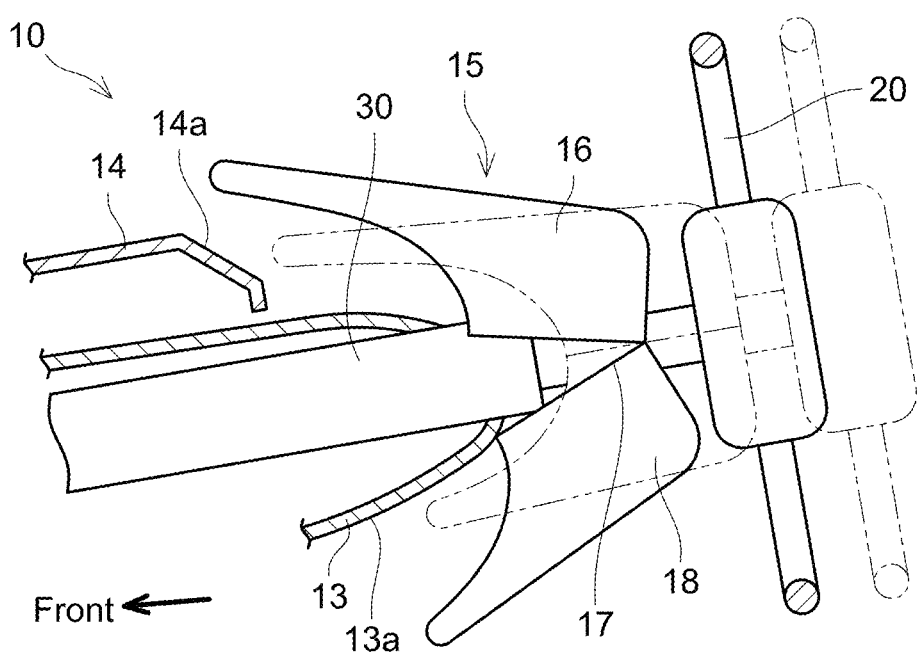
FIG. 4 shows a cross-sectional view to explain the motion of the column cover subsequent to FIG. 3 when the steering column contracts.

As a result, fixation between the first cover portion 16 and the second cover portion 18 is released, and the first cover portion 16 and the second cover portion 18 are separated from each other at the boundary 17. Due to this, as shown in FIG. 4, the first cover portion 16 and the second cover portion 18 can be released so that the first cover portion 16 and the second cover portion 18 do not interfere with and are not caught by the instrument panel 12 (i.e., the contact portion 13) in the second contracted state. This can prevent a situation where the column cover 15 cannot move due to being in contact with the instrument panel 12 and the contraction of the steering column 30 is thereby hindered. The first cover portion 16 and the second cover portion 18 remain connected at their rear ends. In a variant, the first cover portion 16 and the second cover portion 18 may be separated at their rear ends.

In the column cover unit 10, the instrument panel 12 is used to separate the column cover 15. With this configuration, new member(s) do not need to be arranged in the vehicle to separate the column cover 15.

In the column cover unit 10, the first cover portion 16 and the second cover portion 18 are separated in the up-down direction. A large open space is originally provided above the instrument panel 12 to provide clear view for the occupant(s) of the vehicle. Due to this, it is not necessary to greatly change a vehicle structure to provide a space for releasing the first cover portion 16 upward. Similarly, a large open space is originally provided under the instrument panel 12 so that the occupant(s) of the vehicle can place their feet. Due to this, it is not necessary to greatly change the vehicle structure to provide a space for releasing the second cover portion 18 downward. Further, the instrument panel 12 can be disposed continuously in the vehicle width direction.

The contact surface 14*a* is inclined upward toward the front portion of the vehicle. With this configuration, the first cover portion 16 can be smoothly moved upward by sliding on the contact surface 14*a*. With the shape of the contact surface 13*a* as well, the second cover portion 18 can be smoothly moved downward.

Specific examples of the present disclosure have been described in detail, however, these are mere exemplary indications and thus do not limit the scope of the claims. The art described in the claims include modifications and variations of the specific examples presented above.

(Variant)

(1) In the aforementioned embodiment, the contact surface 14*a* includes a flat inclined surface. However, a shape of the contact surface 14*a* may not be flat. For example, the contact surface 14*a* may have a surface curving upward toward the front portion of the vehicle. Alternatively, for example, the contact surface 14*a* may be configured by continuously connecting a plurality of flat surfaces that is angled relative to one another. Similarly, the contact surface 13*a* may be a flat inclined surface, or may be configured by continuously connecting a plurality of flat surfaces that is angled relative to one another.

(2) In the aforementioned embodiment, the upper end panel 14 is separately disposed from other portions of the instrument panel 12. However, the instrument panel 12 may integrally include the upper end panel 14. The contact portion 13 may be separately disposed from the other portions of the instrument panel 12.

(3) In the aforementioned embodiment, the first cover portion 16 and the second cover portion 18 are assembled to configure the column cover 15. However, the column cover 15 may be configured with a single member. In this case, in the column cover 15, strength of a portion corresponding to the boundary 17 may be set to be lower than strength of other portions by, for example, reducing its thickness. Alternatively, the boundary 17 between the first cover portion 16 and the second cover portion 18 may not extend to the rear end of the column cover 15, but may extend to an intermediate portion between the front and rear ends of the column cover 15. Alternatively, the column cover 15 may be configured from a combination of three or more members.

(4) In the aforementioned embodiment, in the column cover 15, the first cover portion 16 and the second cover portion 18 are separated from each other in the up-down direction. However, the column cover 15 may be configured to be separated in a direction different from the up-down direction, such as in the vehicle-width direction.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A column cover unit comprising:
a column cover configured to cover a steering column of a vehicle and comprising a first cover portion and a second cover portion, wherein a boundary between the first cover portion and the second cover portion extends from a front end of the column cover at a front portion of the vehicle toward a rear portion of the vehicle; and
a contact member configured to separate the first cover portion and the second cover portion from each other at the boundary by contacting the column cover when the column cover is moved toward the front portion of the vehicle with the steering column, wherein
the boundary is positioned between the first cover portion positioned on an upper side and the second cover portion positioned on a lower side in an up-down direction,
the contact member comprises:
a first contact portion disposed above the steering column and frontward of the first cover portion in the vehicle; and
a second contact portion disposed below the steering column and frontward of the second cover portion in the vehicle,
the steering column is configured to change its state to a first contracted state and a second contracted state, the first contracted state being a state in which the steering wheel and the column cover contract to move toward the front portion of the vehicle from a normal state in which the steering wheel is disposed at a position for a driver to hold the steering wheel to drive, the second contracted state being a state in which the steering wheel and the column cover contract to move further toward the front portion of the vehicle than in the first contracted state,
the contact member is configured to separate the first cover portion and the second cover portion from each other in the up-down direction at the boundary by the first contact portion coming into contact with the first cover portion to move the first cover portion upward and the second contact portion coming into contact with the second cover portion to move the second cover portion downward when the column cover is moved toward the front portion of the vehicle by the steering column changing its state from the normal state to the second contracted state with contraction of the steering column, and when the steering column is in the first contracted state, the first contact portion is not in contact with the first cover portion and the second contact portion is not in contact with the second cover portion.

2. The column cover unit of claim 1, wherein the contact member is included in an instrument panel positioned frontward of a driver seat of the vehicle.

3. The column cover unit of claim 1, wherein
the contact member comprises a surface facing the front end of the column cover at the front end of the column cover in the front portion of the vehicle, and
the surface is inclined toward the front portion of the vehicle in a direction along which the first cover portion and the second cover portion are separated from each other.

* * * * *